(12) United States Patent
Osborn

(10) Patent No.: US 9,812,836 B1
(45) Date of Patent: Nov. 7, 2017

(54) REVERSIBLE COMPUTATION WITH FLUX SOLITONS

(71) Applicant: The United States of America as represented by the Director, National Security Agency, Washington, DC (US)

(72) Inventor: Kevin D. Osborn, Laurel, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 566 days.

(21) Appl. No.: 14/121,007

(22) Filed: Nov. 12, 2014

(51) Int. Cl.
*H01S 3/00* (2006.01)
*H01S 3/02* (2006.01)

(52) U.S. Cl.
CPC ..................... *H01S 3/02* (2013.01)

(58) Field of Classification Search
None
See application file for complete search history.

(56) References Cited

U.S. PATENT DOCUMENTS

| 7,852,106 | B2 | 12/2010 | Herr et al. | |
|---|---|---|---|---|
| 2015/0263736 | A1* | 9/2015 | Herr | H03K 3/38 326/4 |

OTHER PUBLICATIONS

P. Bunyk, et al.; RSFQ Technology: Physics and Devices; Int'l Journal of High Speed Electronics and Systems; Mar. 2001; pp. 257-305; vol. 11, Issue 1; World Scientific Publishing Company; (URL: http://www.worldscientific.com/doi/abs/10.1142/S012915640100085X).

W.J. Elion, et al.; Observation of the Aharonov-Casher Effect for Vortices in Josephson-Junction Arrays; Physical Review Letters; Oct. 1993; pp. 2311-2314; vol. 71, No. 14; The American Physical Society; (URL: http://www.ncbi.nlm.nih.gov/pubmed/10054641).

K.G. Fedorov, et al.; Pinning of Charge and Flux Solitons in Disordered Josephson Junction Arrays; Physical Review B; Jul. 2011; pp. 014526-1-014526-6; vol. 84, Issue 1; American Physical Society (URL: http://link.aps.org/doi/10.1103/PhysRevB.84.014526).

K.G. Fedorov, et al.; Fluxon Readout of a Superconducting Qubit; Physical Review Letters; Apr. 2014; pp. 160502-1-160502-5; vol. 112, Issue 16; American Physical Society (URL: http://link.aps.org/doi/10.1103/PhysRevLett.112.160502).

(Continued)

*Primary Examiner* — Samantha K Abraham

(57) ABSTRACT

A reversible superconducting circuit includes a plurality of Josephson transmission lines. A first line is configured to transmit a control fluxon when a first input is active. A second line is configured to transmit a target fluxon to one of a third and a fourth line. The circuit is configured to transmit the fluxons at substantially the same time. The second line is configured to transmit the target fluxon to the third line, due to an interaction between the control fluxon and the target fluxon, only if the control fluxon is transmitted at substantially the same time as the target fluxon. The second line is configured to transmit the target fluxon to the fourth line, due to following an adiabatic trajectory, only if no control fluxon is transmitted at substantially the same time as the target fluxon.

20 Claims, 21 Drawing Sheets

(56) References Cited

OTHER PUBLICATIONS

Edward Fredkin, et al.; Conservative Logic; International Journal of Theoretical Physics; 1982; pp. 219-253; vol. 21, Nos. 3/4; Plenum Publishing Corporation (URL: http://link.springer.com/chapter/10.1007/978-1-4471-0129-1_3).

Steven M. Girvin; Superconducting Qubits and Circuits: Artificial Atoms Coupled to Microwave Photons; 2011 (URL: https://copilot.caltech.edu/documents/261-girvin_notes_superconducting_qubits_and_circuits_2011.pdf.

ZiV Hermon, et al.; Dephasing Length and Coherence of a Quantum Soliton in an Ideal Long Josephson Junction; Physical Review Letters; Jun. 1995; pp. 4915-4918; vol. 74, No. 24; The American Physical Society (URL: http://orl.aps.org/abstract/PRL/v74/i24/p4915_1).

Quentin P. Herr, et al.; Ultra-low-power Superconductor Logic; Journal of Applied Physics; 2011; pp. 103903-1-103903-8; vol. 109; American Institute of Physics (URL: http://scitation.aip.org/content/aip/journal/jap/109/10/10.1063/1.3585849).

K.K. Likharev, et al.; RSFQ Logic/Memory Family: A New Josephson-Junction Technology for Sub-Terahertz-Clock-Frequency Digital Systems; IEEE Transactions on Applied Superconductivity; Mar. 1991; pp. 3-28; vol. 1, No. 1; IEEE.

R. McDermott, et al.; Simultaneous State Measurement of Coupled Josephson Phase Qubits; Science; Feb. 2005; pp. 1299-1302; vol. 307; www.sciencemag.org (URL: http://www.ncbi.nlm.nih.gov/pubmed/15731451).

R.G. Mints, et al.; Josephson-vortex Cherenkov Radiation; Physical Review B; Oct. 1995; pp. 9691-9696; vol. 52, No. 13; The American Physical Society; (URL: http://citeseerx.ist.psu.edu/viewdoc/summary?doi=10.1.1.310.7257).

M. Peyrard, et al.; Kink Dynamics in the Highly Discrete Sine-Gordon System; Physica D; May 1984; pp. 88-102; Elsevier Science Publishers, North Holland Physics Publishing Division (URL: http://www.sciencedirect.com/science/article/pii/016727898490006X).

J. Ren, et al.; Progress Towards Reversible Computing with NSQUID Arrays; IEEE Transactions on Applied Superconductivity, Jun. 2009; pp. 961-967; vol. 19, No. 3; IEEE (URL: http://ieexplore.ieee.org/xpls/abs_all.jsp?arnumber=5153026).

J. Ren, et al.; Progress with Physically and Logically Reversible Superconducting Digital Circuits; IEEE Transactions on Applied Superconductivity; Jun. 2011; pp. 780-786; vol. 21, No. 3; IEEE (URL: http://ieexplore.ieee.org/lpdocs/epic03/wrapper.htm?arnumber=5712162).

V.K. Semenov, et al.; Negative-Inductance SQUID as the Basic Element of Reversible Josephson-Junction Circuits; IEEE Transactions on Applied Superconductivity; Jun. 2003; pp. 938-943; vol. 13, No. 2; IEEE (URL: http://eeexplore.ieee.org/document/1211760/).

V.K. Semenov, et al.; Classical and Quantum Operation Modes of the Reversible Josephson-Junction Logic Circuits; IEEE Transactions on Applied Superconductivity; Jun. 2007; pp. 455-461; vol. 17, No. 2; IEEE (URL: http://ieexplore.ieee.org/lpdocs/epic03/wrapper.htm?arnumber=4277704).

A.V. Ustinov, et al.; Fluxon Dynamics in One-dimensional Josephson-Junction Arrays; Physical Review B; Apr. 1993; pp. 8357-8360; vol. 47, No. 13; The American Physical Society (URL: http://prb.aps.org/abstract/PRB/v47/i13/p8357_1).

A.V. Ustinov; Solitons in Josephson Junctions; Physica D; 1998; pp. 315-329; vol. 123; Elsevier Science (URL: http://www.sciencedirect.com/science/article/pii/S0167278998001316).

H.S.J. Van Der Zant, et al.; Ballistic Vortices in Josephson-Junction Arrays; Eurphysics Letters; Feb. 1992; pp. 343-348; vol. 18, No. 4; (URL: http://iopscience.iop.org/0295-5075/18/4/011).

H.S.J. Van Der Zant, et al.; Kink Propagation in a Highly Discrete System: Observation of Phase Locking to Linear Waves; Physical Review Letters; Jan. 1995; pp. 174-177; vol. 74, No. 1; The American Physical Society (URL: http://prl.aps.org/abstract/PRL/v74/i1/p174_1).

H.S.J. Van Der Zant; Quantum, Ballistic Vortices; Physica B; 1996; pp. 344-352; vol. 222; Elsevier Science (URL: http://linkinghub.elsevier.com/retrieve/pii/0921452696002165).

Y.M. Zhang, et al.; Underdamped Long Josephson Junction Coupled to Overdamped Single-flux-quantum Circuits; Applied Physics Letters; Sep. 1997; pp. 1863-1865; vol. 71, No. 13; American Institute of Physics (URL: http://scitation.aip.org/content/aip/journal/apl/71/13/10.1063/1.119423).

* cited by examiner

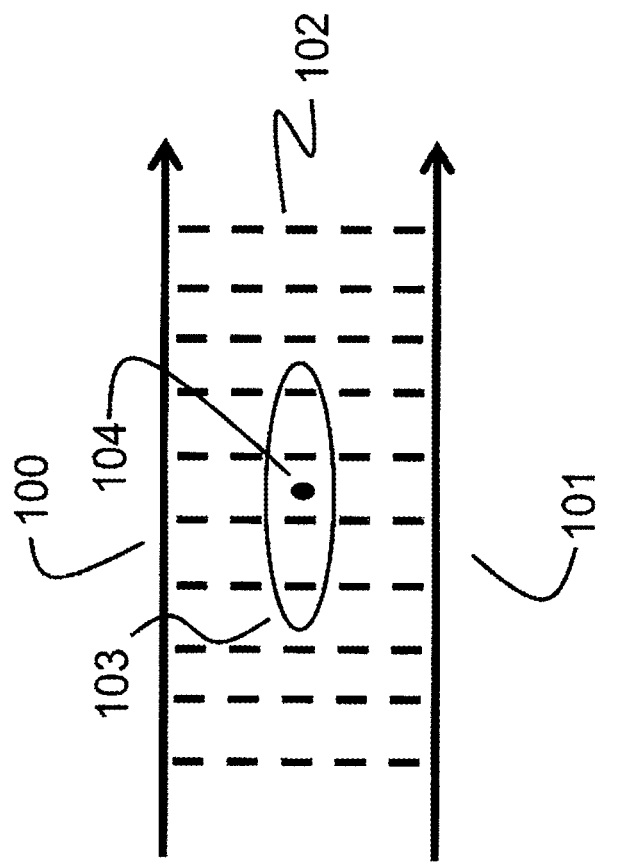

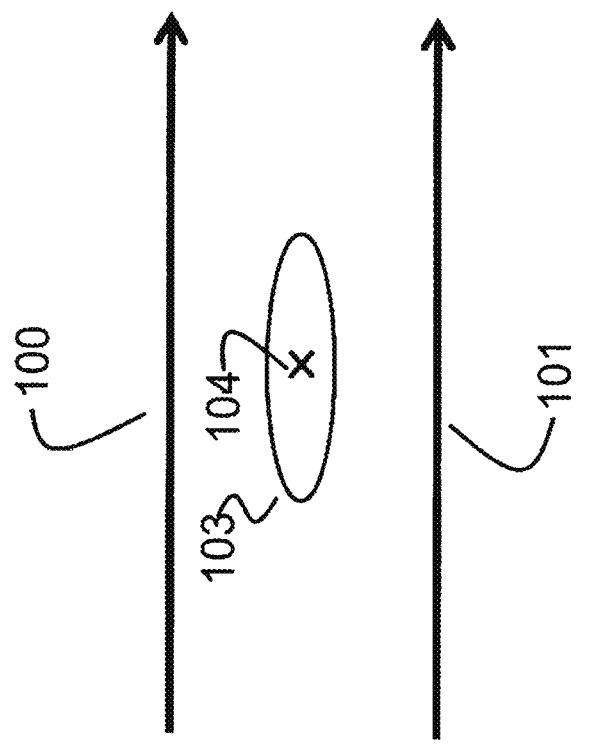

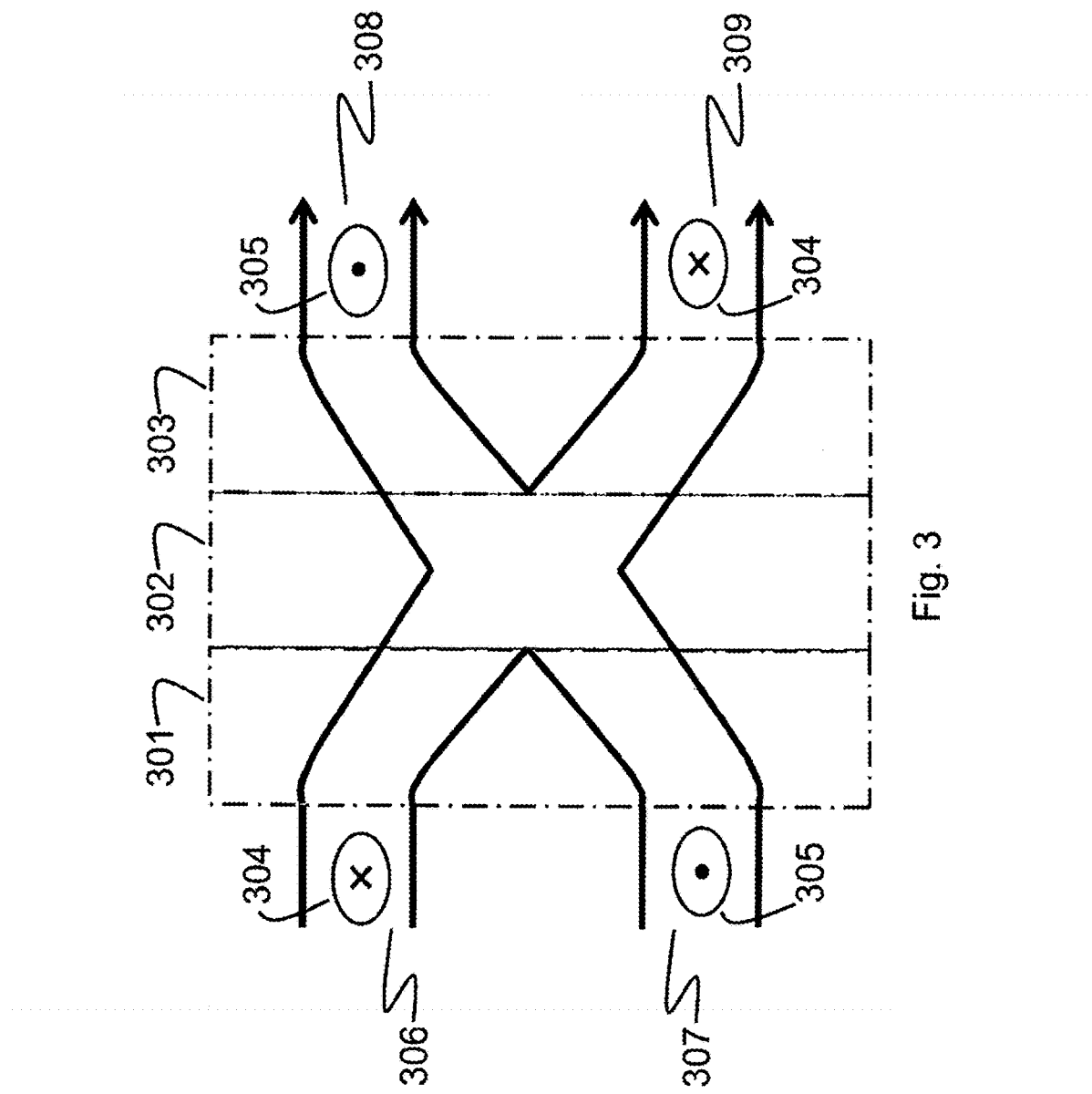

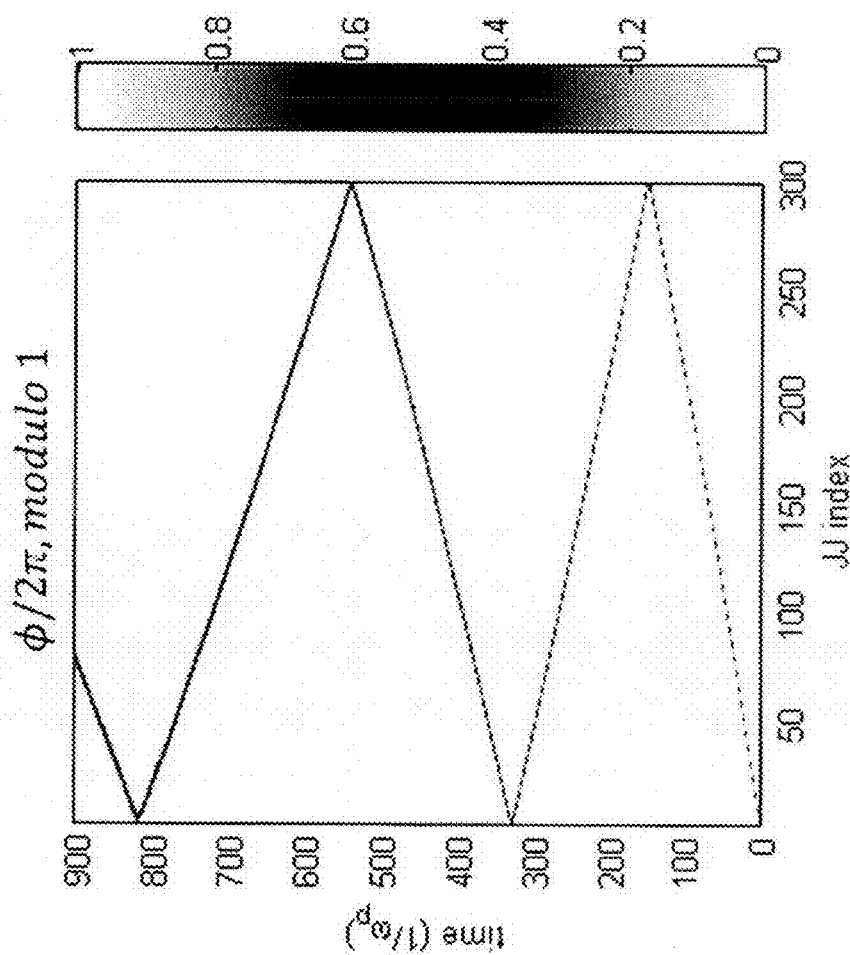

US 9,812,836 B1

REVERSIBLE COMPUTATION WITH FLUX SOLITONS

FIELD OF THE INVENTION

The present invention relates generally to superconductive computing systems, and in particular to systems that generate and compute with flux solitons.

BACKGROUND

Long Josephson Junctions (LJJs), so named because of a long length of the junction relative to the Josephson screening length, can support nonlinear solutions such as a flux soliton. A flux soliton, referred to sometimes with the more general term fluxon, is a soliton having total flux equal to $\Phi_0$, where $\Phi_0$ is the magnetic flux quantum. The shape of the soliton, and other excitations such as chains of fluxons and waves, follows from the Sine-Gordon equation describing the junction. These solitons have been found in practice to dissipate energy as they move, and near the maximum velocity they can create waves at short wavelengths, known as Cherenkov radiation. An LJJ with a soliton drive current has been used to read out a superconducting qubit.

Flux solitons have been measured in an LJJ using superconducting classical logic, where a continuous LJJ makes direct contact to a powered Josephson transmission line (PJTL). Logic families such as Rapid Single Flux Quantum and Reciprocal Quantum Logic have the PJTLs and other powered junctions to propagate fluxons and create gates, respectively. However, the Josephson Junctions in these structures switch individually due to the supplied power and the presence of "localized," or "discrete" fluxons residing within one unit cell of a JTL. These logic families are irreversible, and switch due to an energy, orders of magnitude greater than the theoretical limit defined by $k_B*T*\ln(2)$ (where $k_B$ is the Boltzmann constant), that is supplied by the power source for the switching event.

It has long been recognized that $k_B*T*\ln(2)$ defines a theoretical floor for the amount of energy that is dissipated by a computation that creates one bit of physical entropy, known as the Neumann-Landauer limit, and that conventional computer processing dissipates heat exceeding this amount by orders of magnitude. It similarly has been theorized that this limit would not come into play for computational processes that are both logically and physically reversible, because fully reversible processes do not increase total entropy. However, computational gates and circuits approaching such theoretically possible levels of efficiency have not been demonstrated in previous systems. Note that quantum bits in quantum information research are reversible by themselves, but their control systems have not been designed for efficiency, such that logic operations in these systems also dissipate energy much greater than $k_B*T*\ln(2)$ per operation.

SUMMARY

One embodiment of the present invention is a reversible superconducting circuit. The circuit includes a plurality of Josephson transmission lines. Each Josephson transmission line includes a discretized Long Josephson Junction. Each discretized Long Josephson Junction includes a parallel array of Josephson Junctions and a plurality of superconducting inductors. The inductors connect the Josephson Junctions in the array. Each Josephson transmission line is configured to pass a fluxon along the length of the array of Josephson Junctions. The fluxon is a soliton having total flux equal to $\Phi_0$, where $\Phi_0$ is the magnetic flux quantum. A first of the Josephson transmission lines is configured to transmit a first target fluxon from the first of the Josephson transmission lines to one of a first output and a second output only when a first target input is active. A second of the Josephson transmission lines is configured to transmit a second target fluxon from the second of the Josephson transmission lines to one of the first output and the second output only when a second target input is active. A third of the Josephson transmission lines is configured to transmit a control fluxon only when a control input is active. The reversible superconducting circuit is configured to, when at least two fluxons are transmitted, transmit the control fluxon and the target fluxons at substantially the same time. A path of the first target fluxon and a path of the second target fluxon are determined at least in part by a presence or an absence of the control fluxon. The superconducting circuit is configured to, if the control input is active, transmit the first target fluxon to the first output if the first target input is active and transmit the second target fluxon to the second output if the second target input is active. The superconducting circuit is configured to, if the control input is not active, transmit the first target fluxon to the second output if the first target input is active and transmit the second target fluxon to the first output if the second target input is active.

In related embodiments, an energy dissipation of the circuit is less than $10*K*\ln 2*T$, or less than $K*\ln 2*T$, where K is the Boltzmann constant and T is a temperature of the circuit. Alternatively, or in addition, each fluxon is transmitted substantially without application of a transport current. Each fluxon may propagate ballistically for a period of time greater than $800*1/\omega_p$, where $\omega_p$ is the plasma frequency. A propagation velocity of each fluxon may decay at a rate less than $1.70*10^{-3}$ normalized velocity per $1/\omega_p$, where $\omega_p$ is the plasma frequency and normalized velocity is defined as the propagation velocity divided by a maximum soliton velocity in the same Josephson transmission line. A loss tangent of the Josephson Junctions may be less than $5*10^{-3}$. A ratio between a Josephson inductance of the Josephson Junctions and an inductance of the superconducting inductors may be at least 4.5. A ratio between 1) a standard deviation of a Josephson inductance of the Josephson Junctions and 2) the Josephson inductance of the Josephson Junctions, may be less than 10%.

Another embodiment of the present invention is a reversible superconducting circuit including a plurality of Josephson transmission lines. Each Josephson transmission line includes a discretized Long Josephson Junction. Each discretized Long Josephson Junction includes a parallel array of Josephson Junctions and a plurality of superconducting inductors. The inductors connect the Josephson Junctions in the array. Each Josephson transmission line is configured to pass a fluxon along a length of the array of Josephson Junctions. The fluxon is a soliton having a total flux equal to $\Phi_0$, where $\Phi_0$ is the magnetic flux quantum. A first of the Josephson transmission lines is configured to transmit a control fluxon only when a first input is active. A second of the Josephson transmission lines is configured to transmit a target fluxon to one of a third and a fourth of the Josephson transmission lines. The superconducting circuit is configured to, if the first input is active, transmit the control fluxon and the target fluxon at substantially the same time. The second Josephson transmission line is configured to transmit the target fluxon to the third Josephson transmission line only if the control fluxon is transmitted at substantially the same time as the target fluxon is transmitted. The target fluxon is directed to the third Josephson transmission line due to an interaction between the control fluxon and the target fluxon. The second Josephson transmission line is configured to transmit the target fluxon to the fourth Josephson transmission line only if no control fluxon is transmitted at substantially the same time as the target fluxon is transmitted. The target fluxon is directed to the fourth Josephson transmission line due to the target fluxon following an adiabatic trajectory.

In a related embodiment, the interaction between the control fluxon and the target fluxon includes a magnetic attraction. In another related embodiment, the interaction between the control fluxon and the target fluxon includes a magnetic repulsion.

Another embodiment of the present invention is a method of operating a reversible superconducting circuit. The method includes transmitting a control fluxon along a first Josephson transmission line only when a first input is active. The method also includes transmitting a target fluxon along a second Josephson transmission line to one of a third and a fourth Josephson transmission line. The method also includes if the first input is active, transmitting the control fluxon and the target fluxon at substantially the same time. The method also includes transmitting the target fluxon along the second Josephson transmission line to the third Josephson transmission line only if the control fluxon is transmitted at substantially the same time as the target fluxon is transmitted. The target fluxon is directed to the third Josephson transmission line due to an interaction between the control fluxon and the target fluxon. The method also includes transmitting the target fluxon along the second Josephson transmission line to the fourth Josephson transmission line only if no control fluxon is transmitted at substantially the same time as the target fluxon is transmitted. The target fluxon is directed to the fourth Josephson transmission line due to the target fluxon following an adiabatic trajectory. Each Josephson transmission line of the reversible superconducting circuit includes a discretized Long Josephson Junction. Each discretized Long Josephson Junction includes a parallel array of Josephson Junctions and a plurality of superconducting inductors. The inductors connect the Josephson Junctions in the array. Each Josephson transmission line is configured to pass a fluxon along a length of the array of Josephson Junctions. The fluxon is a soliton having a total flux equal to $\Phi_0$, where $\Phi_0$ is the magnetic flux quantum.

BRIEF DESCRIPTION OF THE DRAWINGS

FIGS. 1A-1F are circuit diagrams of a Long Josephson Junction in accordance with an embodiment of the present invention;

FIG. 3 is a diagram of a crossthrough gate in accordance with an embodiment of the present invention;

FIG. 6 is a graph showing a simulated soliton path in accordance with an embodiment of the present invention;

DETAILED DESCRIPTION

Figure 1A:
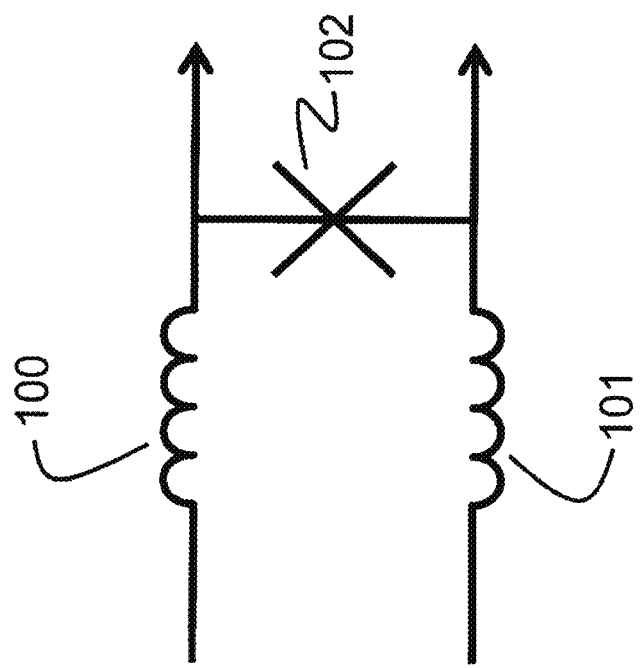

The characteristics of a Long Josephson Junction (LJJ) can be approximated using discrete elements for a junction. Such an arrangement is herein referred to as a discrete (or discretized) long Josephson Junction (DLJJ). In accordance with various embodiments of the present invention, parameters to be considered in construction of a DLJJ include the zero-phase discrete element Josephson inductance ($L_J$) and the discrete element inductance between junctions (L). The discrete element Josephson inductance carries currents perpendicular to the DLJJ. Discrete element inductance between junctions, on the other hand, carries currents parallel to the DLTJ.

In operation, DLJJs transmitting flux solitons exhibit new phenomena that do not appear in operation of classic LJJs. For example, a new type of radiation has been observed in simulation and analysis of DLJJs, which couples to solitons traveling at speeds lower than the maximum velocity. Previous studies of these phenomena have used a transport current. The discrete nature of the DLJJ creates a pinning force that can resist fluxon propagation, and the transport current has been used to overcome the pinning force.

Another observed phenomenon in Josephson junctions powered by a DC transport current is the Aharanov-Casher effect. In accordance with this phenomenon, some measure of ballistic motion of fluxons has been observed, but with large energy input, supplied by a transport current. Accordingly, such studies have provided evidence against the feasibility of creating sustained ballistic motion of fluxons in a DLJJ. Theoretical studies of continuous LJJs in a ring formation have suggested that sufficiently low dephasing might be possible, but the experimental parameters of a continuous LJJ in a ring formation have not been shown to be practical.

In yet another proposed type of superconducting circuit, based on a bistable superconducting quantum interference device (SQUID) and known as the nSQUID, reversible computing applications have been investigated, but here too, flux motion there was powered, and not ballistic.

Surprisingly in light of the results noted above, new investigations have demonstrated that flux solitons can travel substantial distances in DLJJs. This shows that the kinetic energy loss from radiation, dissipation and scattering is very low. It has been observed that suitable circuits may be coupled to DLJJ structures for launching and measuring flux solitons, such that flux soliton movement may be verified experimentally. In achieving substantially ballistic flux soliton movement in the absence of a transport current, a number of parameters were found to be significant. One significant parameter is the ratio $L_J/L$, the ratio of the zero-phase discrete element Josephson inductance to the discrete element inductance between junctions. Another significant parameter is the level of dissipation from capacitance or quasi-particle loss. Another significant parameter is the presence or absence of DC bias connections to the DLJJ. Another significant parameter is the level of critical-current disorder. These parameters are discussed in greater detail below with reference to FIGS. 8A-8B.

Furthermore, it has been appreciated that the ballistic properties of flux solitons in DLJJs, as discussed herein, may be utilized to perform reversible computing. A universal set of classical reversible computing gates based on such ballistic motion of flux solitons is described below. Such gates are suitable for application in various digital and quantum computing contexts. Computations can be executed without a substantial energy input, and may operate below the thermodynamic limit of a gate set by thermodynamic stability, or ~$k_B T$: a regime that is unrealized in other logic (which as mentioned above is in the regime of $>>k_B T$). Specifically, total energy use may be below $k_B*\ln 2*T$, where $k_B$ is the Boltzmann constant, and T is temperature. In some embodiments, the total energy use may be higher, but still far lower than has been realized in previous systems. For example, the total energy use may be below $10*k_B*\ln 2*T$—several orders of magnitude lower than in previous systems.

This is allowed within gates because the flux soliton is expected to scatter adiabatically. Such behavior is caused by junction phases that are connected to one another in a stable non-linear solution (like the Sine-Gordon equation) and switched slower than the inverse Josephson frequency. As a result, the kinetic energy scattering losses are small, and the logic is ballistic parallel to the DLJJ structures. The motion of a control fluxon in a computing gate as described herein can be made to occur over several JJs such that the path of a target fluxon is adiabatic perpendicular to the control LJJ. This can also be contrasted with the classical theoretical implementation of reversible computing based on the elastic collisions of frictionless billiard balls.

A further application of the logic described below is in an interface to one or more superconducting qubits. For classical control circuitry, it is desirable to reduce the number of wires per qubit that connect to room temperature. The most intuitive way of accomplishing this goal is to place the operating logic in the same packaging as the superconducting qubits. Previous circuits which required transport currents or other forms of external power were thus inappropriate for achieving this goal. The low energy cost of the gates disclosed herein, however, allows a low energy dissipation at low temperature, such that a large amount of the logic can easily be operated at millikelvin temperatures where superconducting qubits operate.

The gates disclosed herein also are suitable for classical interfacing to superconducting qubits due to their low noise. Previous systems have not achieved control or readout of qubits using superconducting logic in the same sample packaging. Abrupt switching of a Josephson junction has been found to adversely affect nearby qubits. Although it may be possible to suitably isolate irreversible logic from qubits (e.g., with a long Josephson junction used for separation, filtering, and separate packaging), this approach may prove to be impractical. Furthermore, as noted above, it is desirable to place the logic within the same packaging as the qubits. The nature of the adiabatic switching in the gates as described above may create substantially lower noise on qubits than previous interfaces because insubstantial amounts of energy are dissipated by operation of the gates.

A DLJJ in accordance with an embodiment is now described with reference to FIGS. 1A-1E. FIG. 1A shows a first inductor 100 and a second inductor 101 separated by a Josephson junction 102. The inductors 100, 101 are superconducting inductors with negligible dissipation. The Josephson junction 102 has a parallel capacitance not shown here. The components used should include low loss materials such as are found in superconducting qubits. Thus, niobium, aluminum and/or titanium nitride may be used as the superconductors and amorphous aluminum oxide, amorphous silicon or amorphous silicon nitride and crystals may be used as the low loss dielectrics.

The layout for the circuits can be similar to that used in superconducting qubit technology, in that the inductors 100, 101 are laterally separated in the layout. This avoids vertical stacking of wires, which could create extra capacitive loss. Such a configuration also makes the interactions of fluxons easier to control. Because of this layout, crossthroughs (discussed in detail below with reference to FIG. 3) are used. Among the circuit components of FIGS. 2-4, only FIG. 4 uses a crossover. Accordingly, the basic schematics in FIGS. 1A-1D may in some embodiments be implemented on a chip in a horizontal layout where the Josephson junction 102 connects the physically separated superconducting wires 100, 101. In such an embodiment, the superconducting wires 100, 101 are not disposed in a vertical layout relative to one another. Additional wires may be connected to the left and/or right sides to add to the structure. The architecture includes significant inductance from both superconducting wires, and therefore the potential of the left and right sides of each wire 100, 101 can differ in the presence of time-varying currents.

Figure 1B:
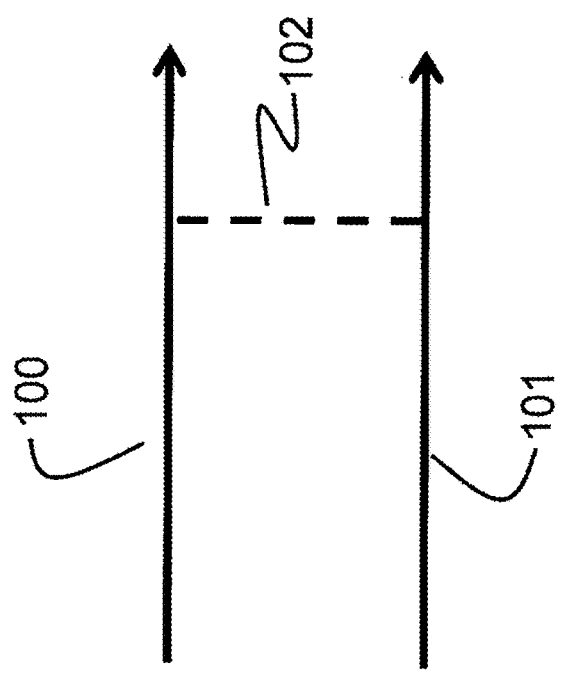

FIG. 1B shows an identical structure as that of FIG. 1A, but with a simplified schematic notation which will prove useful when discussing more complicated structures later. Inductors 100, 101 are now represented as simple solid lines, and the Josephson junction 102 is now shown as a dashed line.

The structure of FIG. 1B then forms the basic building block used in constructing the structure shown in FIG. 1C. Each of the dashed lines of FIG. 1C represents a different Josephson junction, and the structure thus forms a discrete linear array of Josephson junctions along the inductors 100, 101. This structure is known as a Josephson transmission line (JTL), and has been used in superconducting RSFQ and RQL technology. As used here, "a JTL" may be understood as multiple consecutive, connected JTLs, or as a single JTL including the length of the subparts, as context dictates.

The inductance on the wires 100, 101 is small compared to that of the Josephson junction 102, allowing the flux soliton (or, fluxon) to behave similarly to a free particle with no backwards scattering. The fluxon 104 is represented by a dot, which indicates that the magnetic flux is oriented in a direction emerging directly outward from the two-dimensional surface of the drawing. By convention, a fluxon will be represented by an "X" (as in, e.g., FIG. 1D) when the magnetic flux is oriented in the opposite direction, i.e., descending directly downward through the drawing away from the viewer. An oval is used in FIGS. 1C and 1D to show that the currents 103 flow through several Josephson junctions simultaneously. This gives the fluxon a soliton character and contrasts with RSFQ and RQL logic families.

The fluxon 104 can move from left to right, or vice versa, under its own inertia with very little scattering. This is because the potential energy difference experienced during motion is much less than the Josephson energy. The soliton solution for the wave is known in the limit of a fluxon which resides in this structure, in the so-called long Josephson junction limit. In this structure and the following gates, the JTL is a building block because it allows the fluxon to pass through the structure without external added power.

FIG. 1D shows an identical structure as that of FIG. 1C, but with a further simplified schematic notation which will prove useful when discussing more complicated structures later. Solid lines are still used to represent the inductors 100, 101, but the Josephson junctions connecting them are not explicitly drawn. The size of the fluxon 104 is still implicitly understood as spanning multiple Josephson junctions. In FIG. 1D, the orientation of the magnetic flux of the fluxon is indicated by the use of an "X" as was discussed above.

The fluxon may be injected at one end of the structure between the inductors 100, 101, and may flow through the circuit (between the solid lines) and out through the other end.

Figure 1E:
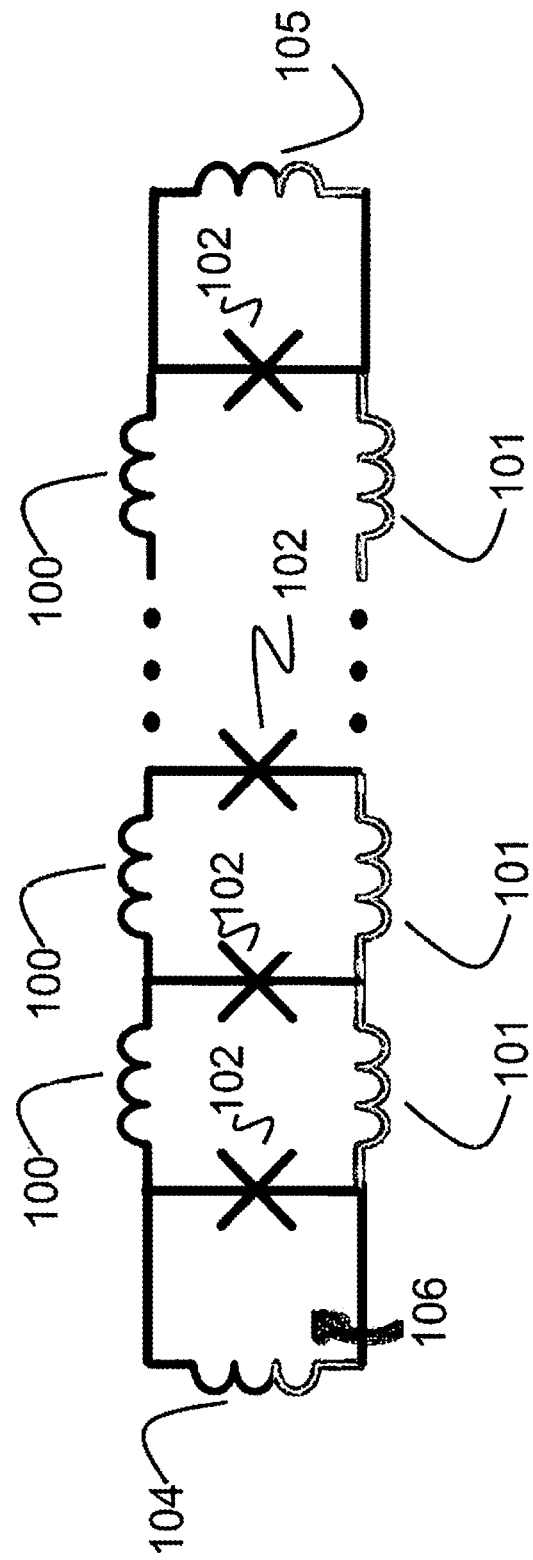

FIG. 1E provides an alternative view of FIG. 1D, using the more conventional notation. In FIG. 1E, however, the circuit has been shorted by inductors 104 and 105, which form end loops. Within each loop 106 a Josephson phase of the adjacent junction 102 can be controlled with an external magnetic flux through the loop. This structure is used for simulations of the JTL. The phase is determined according to the inductances $L_J$ and $L$, as well as any external field(s) and excitations such as solitons, linear waves, and/or other noise.

Figure 1F:
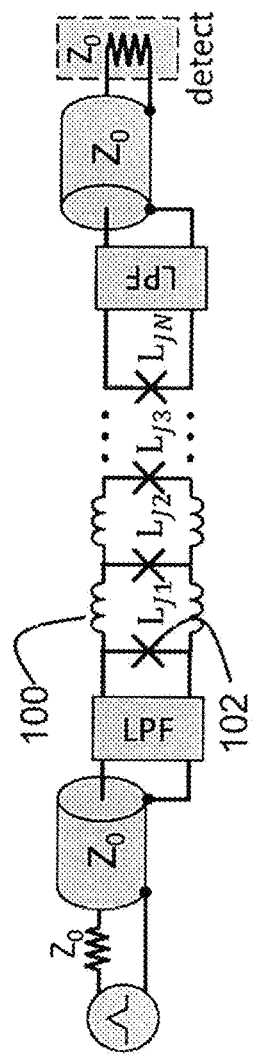

FIG. 1F shows a similar configuration to the view of FIG. 1D, in which launch and detection circuitry replace the inductors 104 and 105 of FIG. 1D. Simulations have been performed on the circuit shown in FIG. 1F. It has a central region of Josephson junctions 102 in parallel with each other and connected via inductors of value L/2 (resulting in a linear inductance per cell of L). Previous simulations on this DLJJ were performed with inductive terminations at the left and right end of the DLJJ. However, in this circuit, other circuit elements are added, which creates a realistic circuit to demonstrate soliton propagation for computing. On the far left hand side of the figure there is a voltage source which is configured to create a voltage pulse. The pulse travels, creating a voltage pulse on the resistor and a wave in the transmission line, schematically shown as a coaxial cable, where both have the impedance of $Z_0$. After the voltage wave reaches a low-pass filter (LPF), some of the voltage pulse energy can create a soliton in the DLJJ. The LPF uses two capacitors and one inductor to provide a low pass filter which allows the transfer of energy up to the plasma frequency of a Josephson junction. This filter can also be designed for an approximate impedance match between the linear transmission line and waves in the nonlinear DLJJ. With a pulse of sufficient amplitude and width of at least a few inverse plasma frequencies a single soliton is reproducibly launched into the DLJJ. In simulations discussed below, it is launched with a velocity of approximately 0.6 to 0.7 times the maximum possible velocity (the Swihart velocity).

After a soliton travels the length of the DLJJ, it encounters another LPF, which is the same filter on the other side, but reversed in direction. This filter allows the soliton energy to enter the LPF and the transmission line (schematically shown as a coaxial cable) such that the soliton is not reflected and only a small amount of waves return leftward down the DLJJ. Waves of frequency near the plasma frequency propagate down the right transmission line as a result of the soliton colliding with the LPF, and they are detected as a wavefront in the termination resistor of impedance $Z_0$. The launch and detection is found to be created very reproducibly, such that propagation studies of the soliton can be demonstrated in practice.

Solitons in the circuit of FIG. 1F were found to gradually slow, or decelerate, as they propagate. This was tested by measuring the circuit containing the first 50, 150 and 250 Josephson junctions from a statistical sampling. From the propagation time differences, the velocity, deceleration and uncertainty in these quantities was tested. The deceleration of the soliton with various DLJJ parameters is shown in FIG. 8B.

Figure 8A:
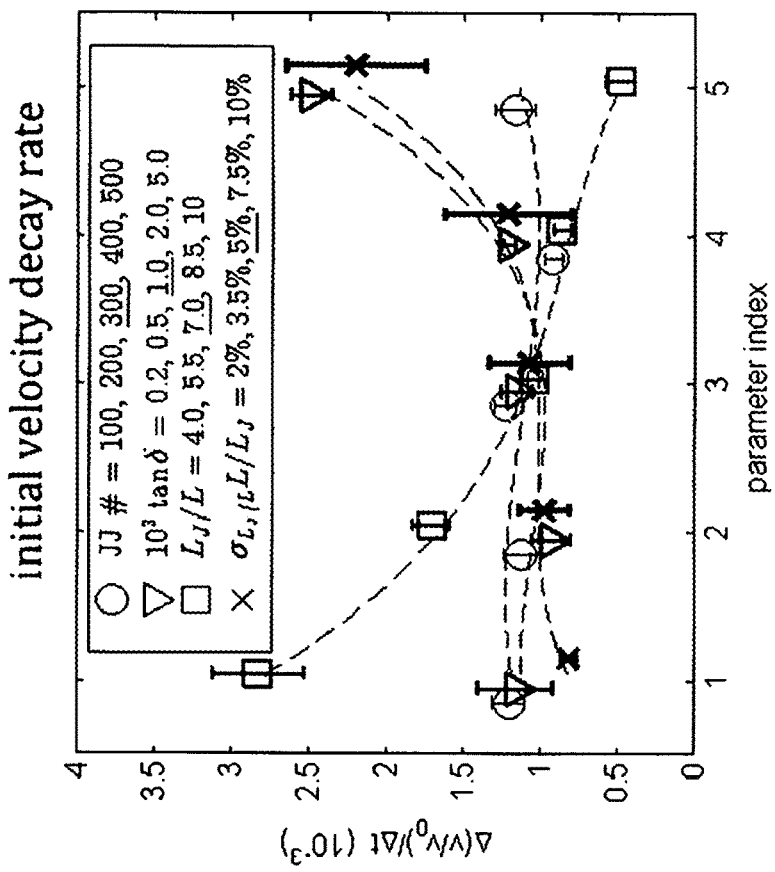
FIGS. 8A-8C are graphs showing the observed effects of various parameters on soliton velocity decay rate.
Figure 8B:
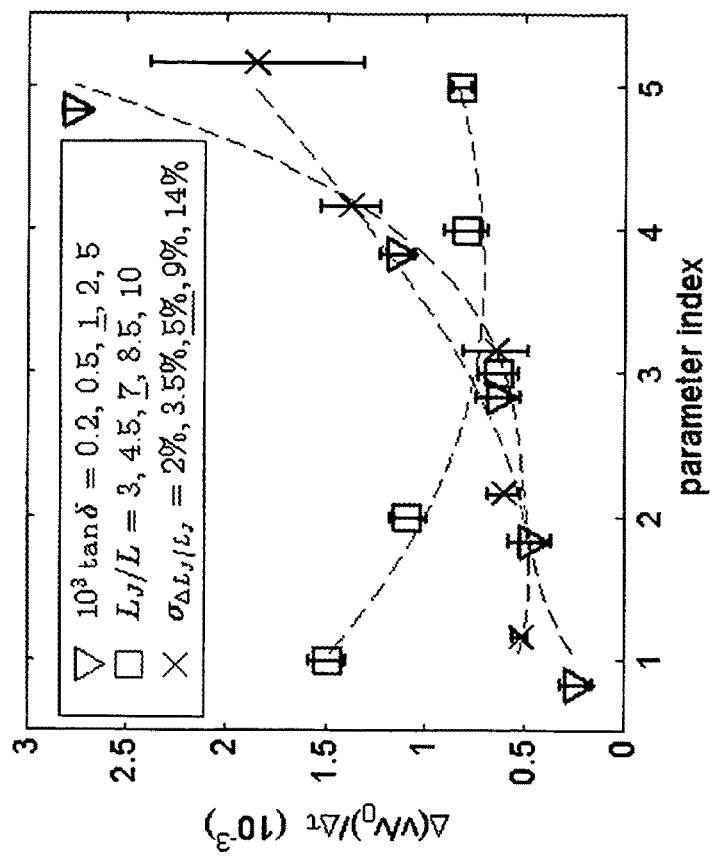

The deceleration on the vertical axis in FIG. 8B is shown as the change in normalized velocity per normalized time, where the normalized velocity is the velocity divided by the Swihart velocity and the normalized time is the time multiplied by the nominal Josephson junction plasma frequency. The horizontal axis of the plot corresponds to the number of a parameter value in the legend. For a given symbol shape, there are 5 parameter values listed in the legend which correspond to the indices on the horizontal axis (in order), while the parameters corresponding to other symbols are fixed at the (underlined) central value. The error bars indicate the uncertainty in the deceleration. The plots show that a loss tangent (tan δ) below $5 \times 10^{-3}$ and $L_J/L$ above 4.5 have low values of deceleration, and are thus indicators of good performance for reversible soliton computing. Uncertainty in $L_J$ relative to its mean value is very high for the parameter value of 14%, because this will limit performance as discussed below.

In order to make reversible gates using multiple DLJJs, solitons arrive and propagate through a gate substantially synchronously. This allows the solitons to interact in the course of propagating through the gate such that the gates work correctly. For a given deceleration, velocity and uncertainty in the deceleration, we calculated the length over which solitons in different DLJJs will desynchronize. They are considered desynchronized if their position differs by a Josephson penetration depth. To a reasonable approximation, for propagation lengths in the gate shorter than this length we can expect the gate to work as designed, while the opposite is true for longer lengths.

Figure 8C:
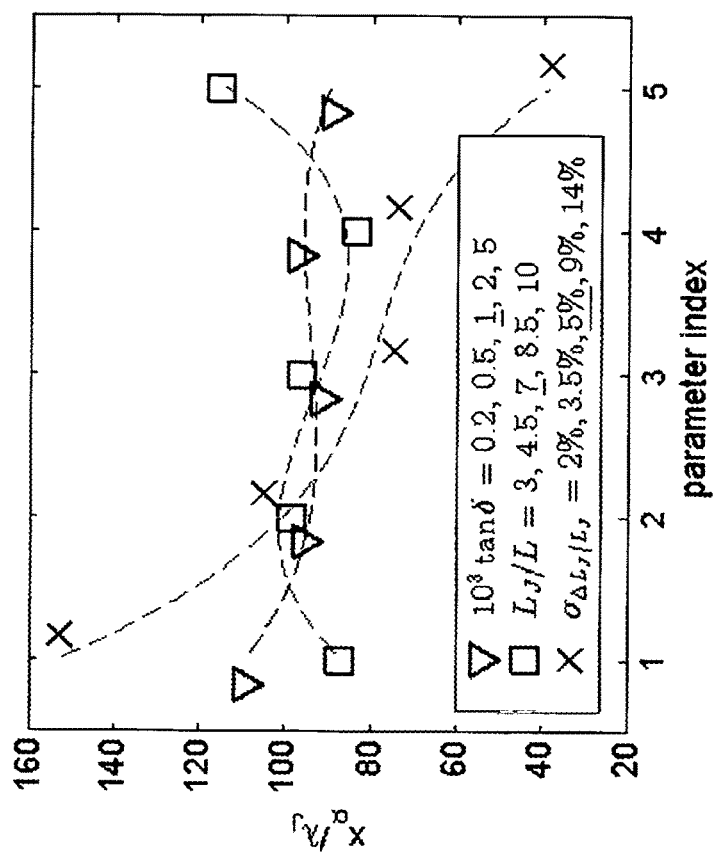

FIG. 8C shows the synchronization length due to deceleration $x_\alpha$ divided by the Josephson penetration depth $\lambda_J$. For the central values of the parameter list, (tan δ=1, $L_J$=7, and $\sigma_{\Delta L_J/L_J}$=5%), two solitons are found to travel approximately 75 to 100 Josephson penetration lengths using this structure. Such an amount suffices for gates, but it is important to realize that this circuit contains uncertainty in the deceleration created by the launch and detection circuitry, which can be improved using on-chip synchronization circuits. The synchronization length drops to approximately 40 Josephson penetration depths when $\sigma_{\Delta L_J/L_J}$=14%, due to the large uncertainty in deceleration at this value. This critical current uncertainty makes the circuit less appropriate for use in computing circuits.

The desynchronization length found from the uncertainty in the soliton velocity was also calculated, where this or the desynchronization from deceleration uncertainty would limit the total synchronization length if it were smaller. The velocity uncertainty was found not to limit the total synchronization for the central parameter values. However, it was found to limit the total length for certain values, such as tan δ=$5 \times 10^{-3}$, $L_J/L$=3, or $L_J/L$=9%.

Figure 7A:
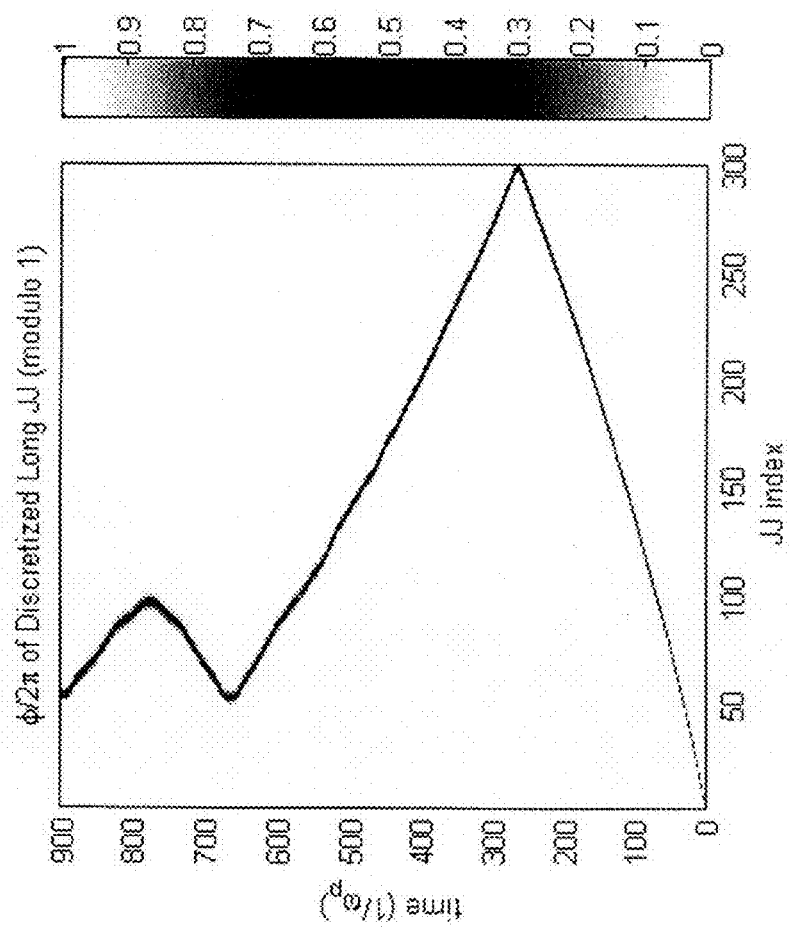
FIGS. 7A-7C are graphs showing a simulated soliton path displaying premature velocity decay.
Figure 7B:
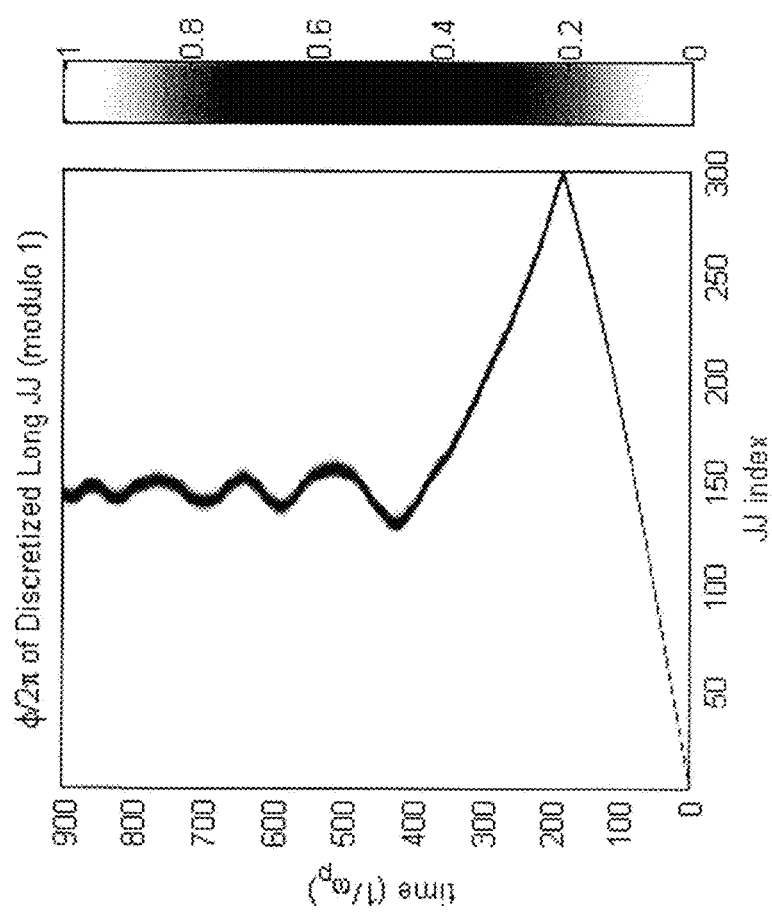
Figure 7C:
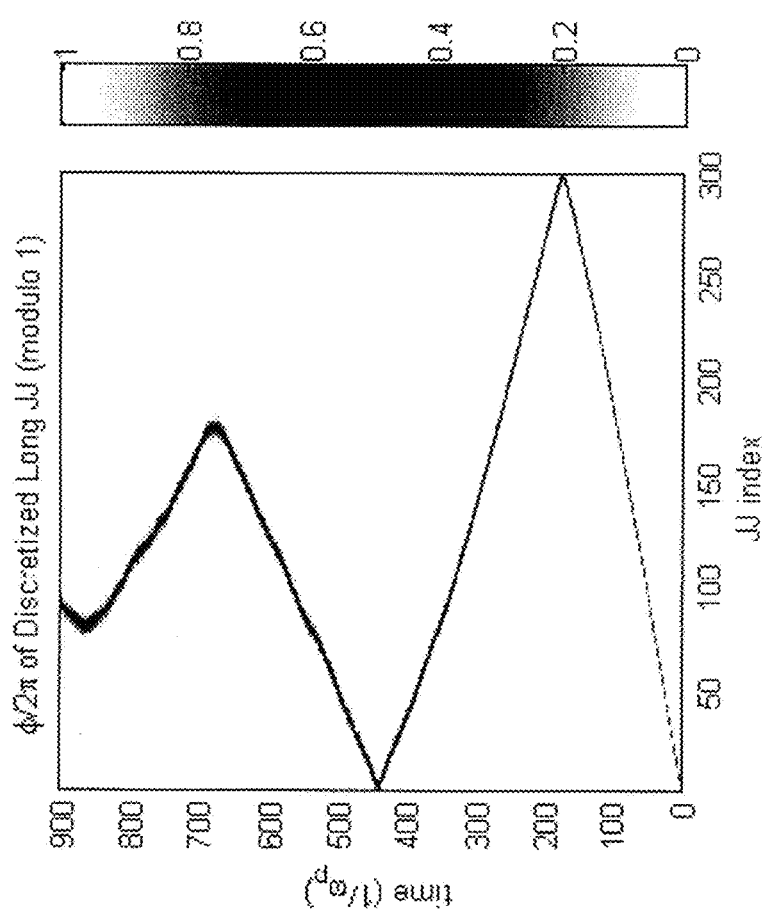
Figure 9:
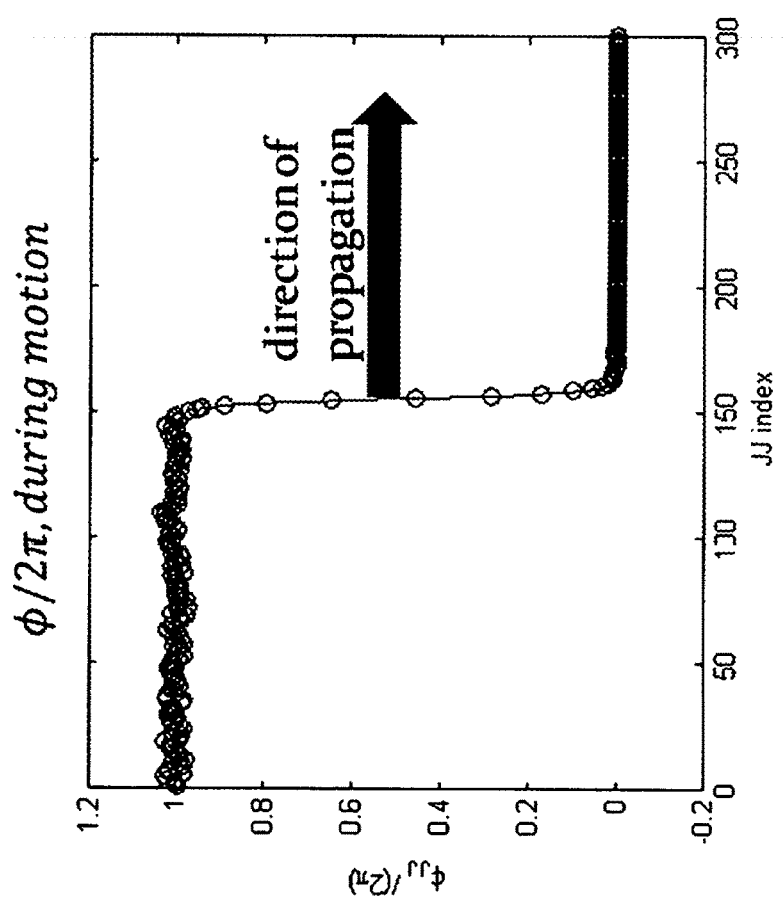
FIG. 9 is a graph showing phase characteristics over time.
Figure 10:
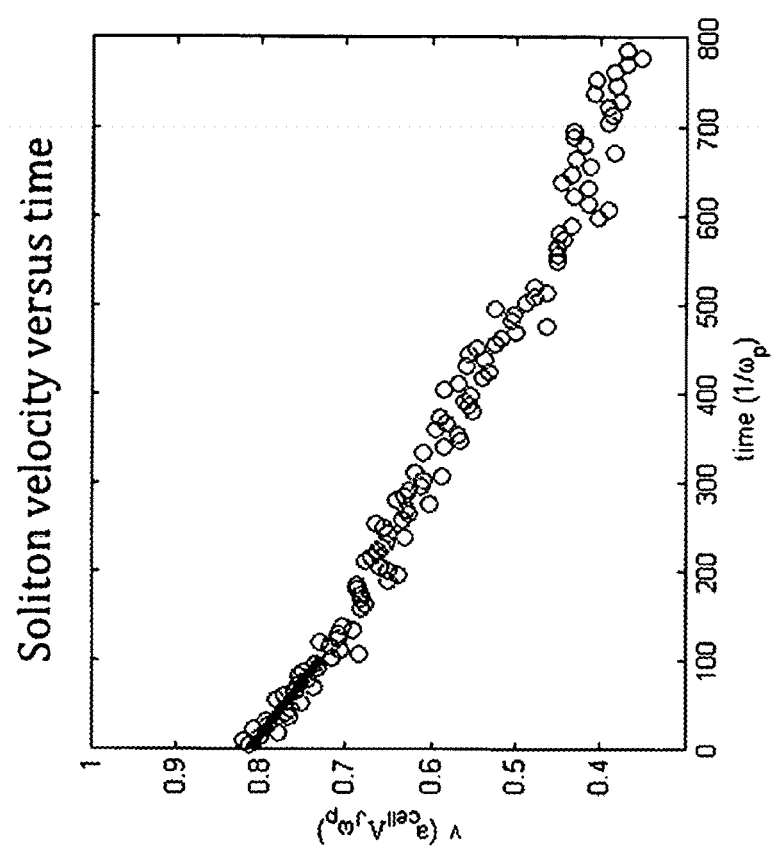
FIG. 10 is a graph showing soliton velocity over time.

An exemplary simulation of a flux soliton propagating ballistically in a DLJJ is shown in FIG. 6. In this example, the DLJJ includes 300 Josephson junctions. A color bar to the right of the graph shows that the phase of the junctions, modulo 2 times pi, is approximately equal to pi when black is shown in the graph. This phase also corresponds to the center of the fluxon. While the fluxon is shown here in black, noise also appears in grey. The fluxon propagates from Josephson junction number 1 to the end of the DLJJ (number 300) in a time equal to approximately 150 times the inverse plasma frequency of a Josephson junction. The soliton rebounds from the end of the DLJJ and travels back towards the beginning, reaching the beginning in about another 175 times the inverse plasma frequency. Propagation continues in this fashion, with the soliton propagating substantially ballistically, but with gradual velocity decay, until the end of the graphed area at 900 times the inverse plasma frequency. These results also can be understood as shown in the graph of FIG. 10, which plots soliton velocity against time. In the case shown, soliton velocity decays substantially linearly over the measured timeframe. This velocity delay may be less than $1.70*10^{-3}$ normalized velocity per inverse plasma frequency, where normalized velocity is the propagation velocity divided by the maximum soliton velocity in the same JTL. Propagation of the soliton corresponds to a phase kink of $2\pi$ at the center of the soliton. This phenomenon is shown in FIG. 9, where it also can be seen that a small amount of noise is present in the phase found in the wake of the soliton. As will be discussed below, FIGS. 7A-7C show how flux solitons fail to propagate ballistically in an unpowered circuit when improper parameters are used (e.g., as was the case in previous attempts to implement flux soliton propagation in a DLJJ).

FIG. 8A is a graph showing the results of simulated experiments to determine initial velocity decay rates of flux solitons in DLJJs according to different values of significant system parameters. In a base case, the number of Josephson junctions was 300, $10^3$ times the Josephson junction loss tangent ($10^3 \tan \delta$) was 1.0, $L_J/L$ was 7.0, and the ratio of 1) the standard deviation of $L_J$ to 2) $L_J$ was 5%. Each parameter was allowed to vary while the other parameters were kept at the base case values. The symbols on the graph include error bars showing the confidence regions of the measured results. The base case values were determined to allow the system to operate substantially as designed, and the experiments show how the tolerances of the system may be improved by modifying parameter values.

As shown in FIG. 8A, the number of Josephson junctions used in the DLJJ was allowed to take on values of 100, 200, 300, 400 and 500. While the velocity decay appears to be smallest at 400, no statistically significant difference in performance was observed for the different values of this parameter.

As shown in FIG. 8A, the loss tangent was allowed to take on values of 0.2, 0.5, 1.0, 2.0 and 5.0. For the values between 0.2 and 2.0, the variation in performance was minimal, but initial velocity decay increased by a significant amount when the loss tangent was 5.0. It is therefore preferred to choose a value for this parameter that is less than 5.0.

As shown in FIG. 8A, the ratio $L_J/L$ was allowed to take on values of 4.0, 5.5, 7.0, 8.5 and 10. The results indicate a strong correlation between a high ratio and improved performance. As increasing the value of this parameter may be difficult and expensive in practice, selection of a value for this parameter may involve a cost-benefit analysis. It is preferred to choose a value for this parameter that is at least 7.0, but acceptable results have been observed for the value 5.5, or even 4.5, as well, and so it is not required to achieve 7.0.

As shown in FIG. 8A, the ratio of 1) the standard deviation of $L_J/L$ to 2) $L_J/L$ was allowed to take on values of 2%, 3.5%, 5%, 7.5% and 10%. For the values between 2% and 7.5%, the variation in performance was minimal, but initial velocity decay increased by a significant amount when the value of this parameter was 10%. It is therefore preferred to choose a value for this parameter that is less than 10%. In some embodiments, the value may be chosen as any value less than 14%.

FIGS. 7A-7C show simulated examples of soliton trajectories in DLJJs that have been constructed with parameters outside of the functional ranges identified above. The parameters were in each case set to the "base case" values above, except as otherwise noted.

The simulation in FIG. 7A was performed with the parameter LA, set to 4. In this case, at a discreteness of 4, backscattering generally occurs prior to 700 times the inverse plasma frequency. While the soliton travels ballistically for some amount of time, the initial rate of velocity decay is much greater than is desirable for practical computational applications. The value "discreteness" is known in the art variously as $L_J/L$, or alternatively as the square root of $L_J/L$. The definition of discreteness as being $L_J/L$ is used here.

The simulation in FIG. 7B was performed with the loss tangent parameter set to $5*10^{-3}$. The soliton trajectory breaks down even faster here than in FIG. 7A. The excessive amount of damping causes significant slowing and backscattering at a mere several hundred times the inverse plasma frequency.

The simulation in FIG. 7C was performed with the standard deviation of $L_J/L$ to 2) $L_J/L$ set to 10%. The soliton trajectory breaks down similarly to FIG. 7A, exhibiting backscattering at about 670 times the inverse plasma frequency, along with significant slowing.

Operation of a computational gate is now described with reference to FIGS. 2A and 2B. The gate shown is a new component which will be referred to as a fluxon switch gate. In one implementation, the presence of a data, or target fluxon 211, at a given time, corresponds to a computational data input of logical "1," whereas the absence of such a fluxon at a given time corresponds to a computational data input of logical "0." Similarly, the presence or absence of a control fluxon 212 at a given time corresponds to a logical "1" or "0" value, respectively, of a control input. Other implementations are possible as well, in which the target fluxon, control fluxon, or both are conventionally understood as having the opposite logical values.

A reversible switch gate conditionally routes an input data signal based on the value of a control signal, as shown in the following logical table:

| Input | Control | Output |
| --- | --- | --- |
| 1 | 1 | 01 |
| 1 | 0 | 10 |
| 0 | 1 | 00 |
| 0 | 0 | 00 |

Figure 2A:
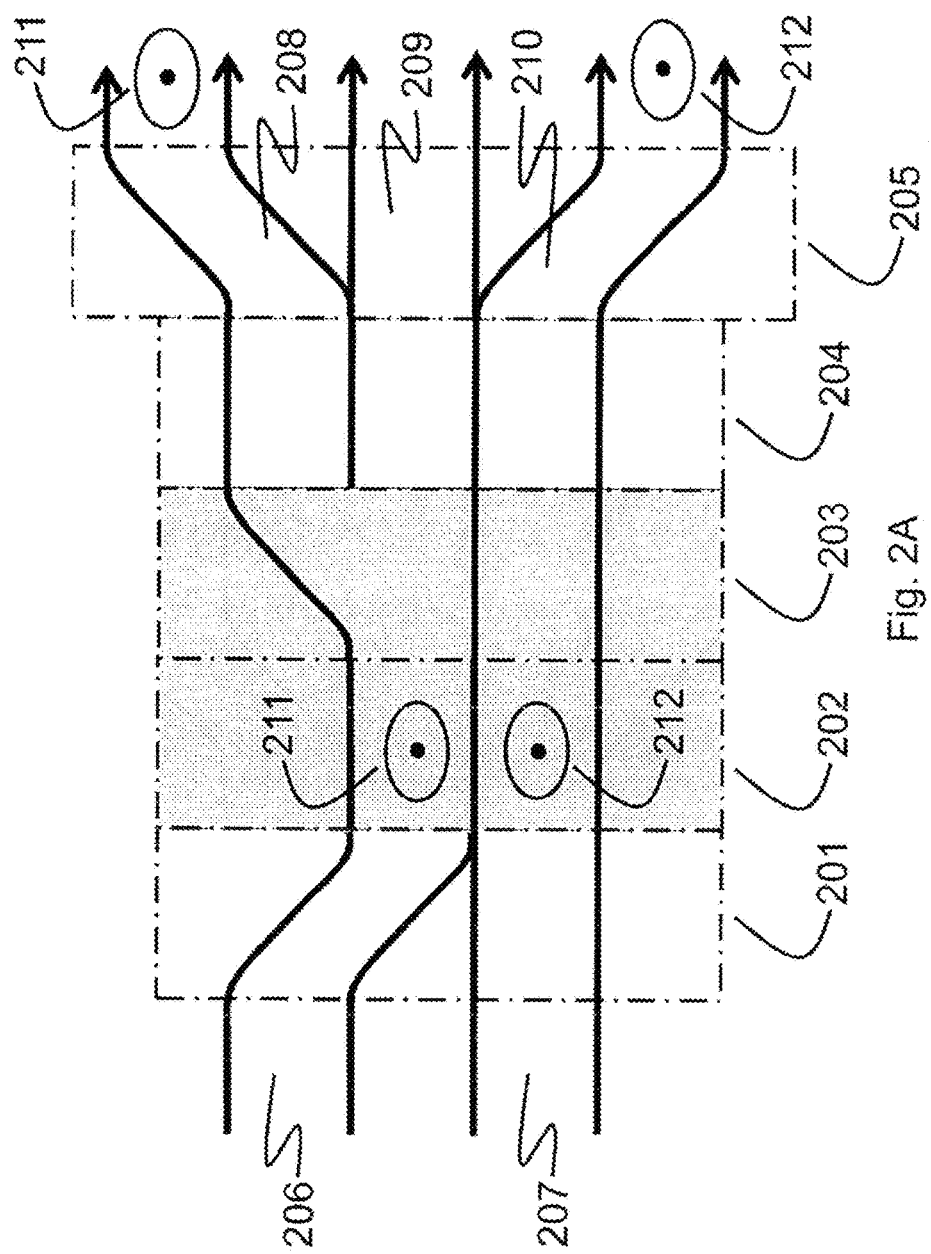
FIGS. 2A-2B are diagrams of a switch gate in accordance with an embodiment of the present invention.
Figure 2B:
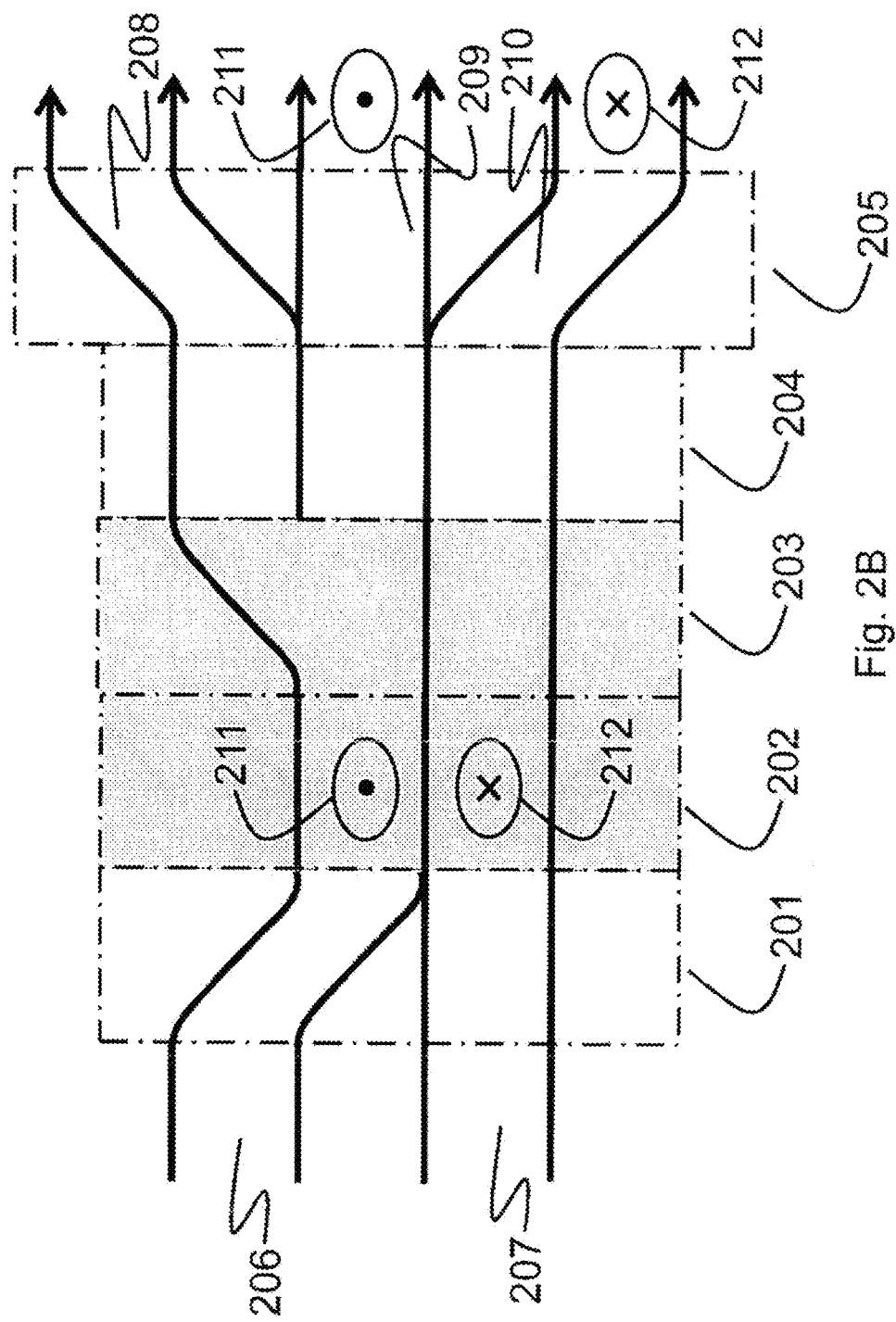

The fluxon-based gates shown in FIGS. 2A and 2B may be used to implement a classical switch gate. The target fluxon 211 enters a JTL at position 206. If and when a control fluxon 212 is also present, it enters a separate JTL at position 207. Position 206 and position 207 may be separated in space such that fluxons 211, 212 do not exert significant magnetic effects on one another. This allows for the chaining of numbers of gates together without concern that the behavior of fluxons in one gate will have any undesired effects on behavior in other gates at the boundaries. The fluxon(s) travel ballistically along the respective JTLs through region 201, where the side-by-side JTLs gradually approach one another, and continue along until the JTLs are substantially adjacent at region 202. The inductors may merge so that the adjacent JTLs share a common inductor. At this point, the control fluxon 212, if present, will exert a magnetic force on the target fluxon 211 (and vice versa). In FIG. 2A, as the two fluxons are similarly quantized, the magnetic force is one of repulsion. In FIG. 2B, however, the two fluxons are oppositely quantized and exert an attractive force on one another.

With further reference to FIG. 2A, as the fluxon(s) continue to travel ballistically, they pass into region 203, where if the control fluxon 212 is present, target fluxon 211 begins to shift upward and away from the control fluxon 212, such that its ballistic path takes it into the upper section of region 204 and further into JTL 208 in region 205. Conversely, if the control fluxon 212 is absent, then the adiabatic trajectory of the target fluxon 211 will lead it to JTL 209 in region 205. The control fluxon 212 is given no choice of path, and thus exits the gate via JTL 210 in region 205. As with the entry points to the gate, each of the JTLs 208, 209, 210 lead to exit points that are separated in space from one another.

Operation of the switch gate of FIG. 2B is exactly the same as the gate shown in FIG. 2A, except that the paths taken by the target fluxon 211 are the opposite. The target fluxon 211 exits via JTL 209 when the control fluxon 212 is present due to the attractive force between the two fluxons. The target fluxon 211 exits via JTL 208 when the control fluxon is absent due to following an adiabatic trajectory. In the device shown in FIG. 2B, the parameters are changed relative to those in FIG. 2A. Specifically, if a target fluxon enters the gate without a control fluxon, it is made to move to travel in a non-straight trajectory as it propagates through region 203, such that it exits at 208. This may be engineered by placing values of inductors and Junction critical currents in region 203 such that the potential energy is higher in the straight path compared to a curved trajectory. This will cause the fluxon to move upward on the schematic, as the fluxon will move adiabatically in a curved path according to the force created by the potential. Then, if a control fluxon also is present (with opposite polarity), the target fluxon will be attracted to it, which will change the potential energy landscape such that the fluxon will propagate straight and exit through 209.

The result of the computation performed by the gate is indicated by the presence or absence of a target fluxon 211 at a selected output. For example, by convention, the presence of a fluxon at JTL 208 may be interpreted as a logical "1," while the absence of a fluxon at JTL 208 may be interpreted as a logical "0." The absence may be due to the absence of a target fluxon 211 at the selected time. In other cases, the absence may be due to the target fluxon 211 being directed to JTL 209, either due to the presence (FIG. 2B) or absence (FIG. 2A) of the control fluxon 212. Alternatively, the logical readout could be based on the presence or absence of a fluxon at JTL 209.

There are several significant features to the fluxon switch gate described above with reference to FIG. 2B: 1) the gate allows small oscillations between two fluxons moving about the central position only created by the net attraction and initial conditions, 2) the gate is reversible such that fluxons can enter from the right and undo the operations described, and 3) the present architecture greatly reduces the overhead compared to previous theoretical proposals of classical reversible computation (e.g., the "billiard-ball computer"). When operating, it is important to avoid timing delays on the output of the control which are correlated with the second fluxon, since information in this architecture is encoded in the path, and timing differences between the target and control fluxons could lead to changes in the paths followed by the fluxons. Although the net attraction of fluxons can help to synchronize gates, in general there is a finite amount of timing error produced by gates which induce logical errors. A simple structure can be added outside of the gate to control the timing errors of fluxons and errors can be corrected with additional gates. Such structures would reduce entropy, and thus would use some energy, though the amount of energy may be relatively small. Additionally, a small number of fields may be distributed around a chip to resynchronize fluxons between sets of gates.

Operation of a gate is now described with reference to FIG. 3. The gate shown is a new component which will be referred to as a fluxon crossthrough gate. This gate is not a logic gate, as it does not perform any computation. Rather, it is one of two gates, the other being a fluxon flip gate (discussed below with reference to FIG. 4) that will be used to construct more complicated logic gates, such as the Fredkin gate (described below with reference to FIGS. 5A and 5B). As was mentioned above, it is advantageous to avoid stacking components and to maintain a substantially two-dimensional environment in building fluxon-based computational structures. The fluxon crossthrough gate allows the paths of two fluxons to cross such that they pass through one another without unwanted interference. An analogue in classical electronic computer circuits would be two wires that cross paths on a chip. In such a situation, one wire is elevated relative to the other so that the two wires may cross paths. If the two wires were to meet and pass through one another, the two wires would become electrically connected, shorting the circuit. In the case of fluxon paths, however, such a crossthrough can be achieved.

Target fluxons 304, 305 enter a pair of JTLs at positions 306 and 307, respectively. As shown in FIG. 3, the polarities of the fluxons 304, 305 are opposite of each other. This has been found to be advantageous in allowing the fluxons to cross through each other without scattering, but it is possible to implement such a gate with fluxons of similar polarities, as well. At the entry points to the gate, the fluxons are separated in space. As the fluxons propagate ballistically, they enter region 301, where the spatial separation begins to decrease. As the fluxons enter region 302, they cross through one another and continue along adiabatic trajectories such that fluxon 304 continues through region 303 to JTL 309, while fluxon 305 continues to JTL 308. Fluxon 305 exits the gate at position 308, and fluxon 304 exits the gate at position 309. The crossthrough gate also allows single fluxons to pass through and is not limited to situations where two time-synchronized fluxons enter and exit the gate at substantially the same time.

Figure 4:
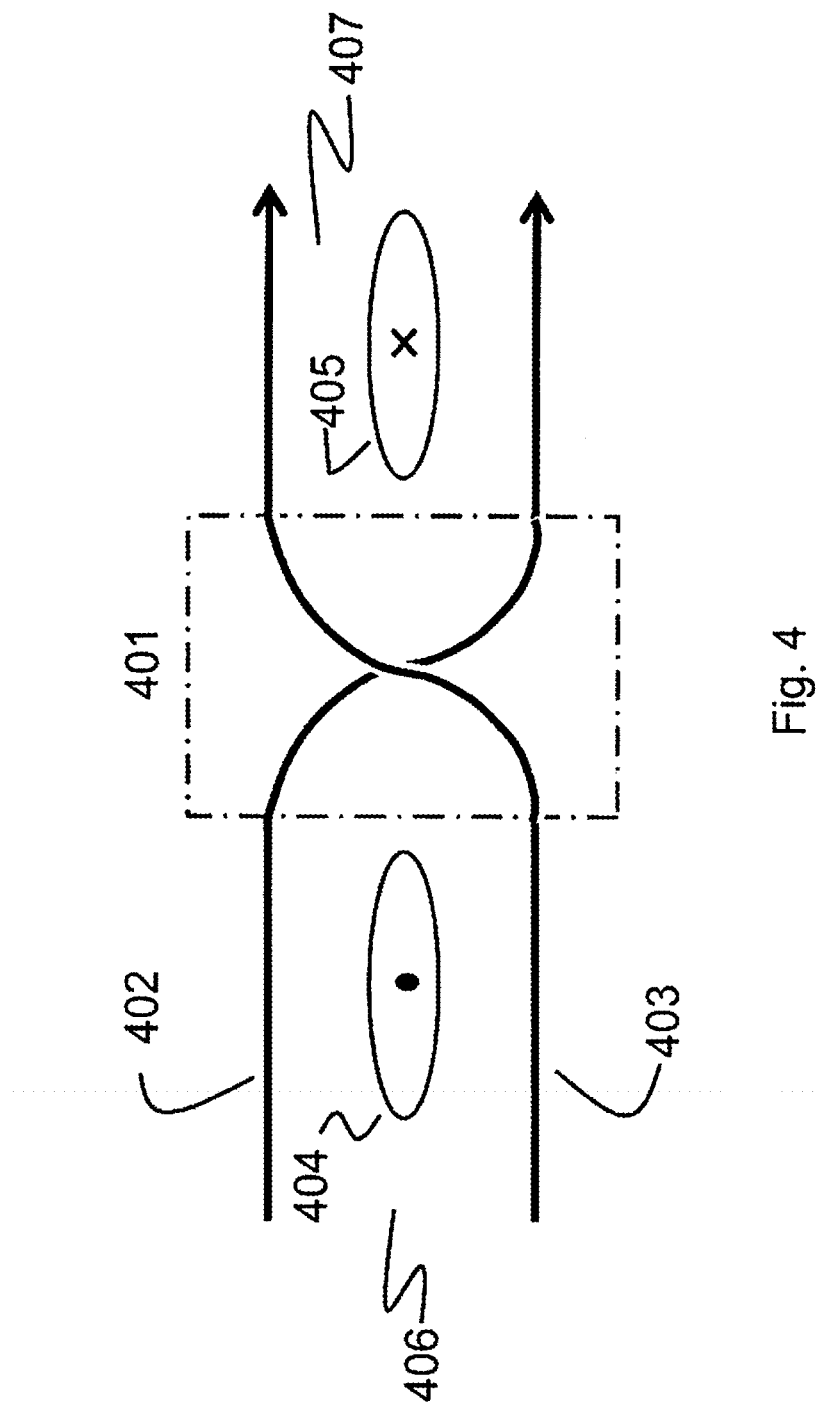
FIG. 4 is a diagram of a flip gate in accordance with an embodiment of the present invention.

Operation of a gate is now described with reference to FIG. 4. The gate shown is a new component which will be referred to as a fluxon flip gate. This gate is not a logic gate, as it does not perform any computation. Rather, it is one of two gates, the other being a fluxon crossthrough gate (discussed above with reference to FIG. 3) that will be used to construct more complicated logic gates, such as the Fredkin gate (described below with reference to FIGS. 5A and 5B). As was noted above, in one implementation of a crossthrough gate, the fluxons are of opposite polarity. This may be achieved using flip gates where needed to flip the polarity of a fluxon, which is designed to occur in an adiabatic manner such that there is a low probability of reflection.

Fluxon 404 enters the gate at position 406, through a JTL bounded by inductors 402, 403. These inductors physically cross over one another in region 401. This is the only component of the gates discussed herein that relies on two distinct components being positioned at vertical displacement from one another. While fluxons have been illustrated in various figures in two dimensions, the dipole character field of the fluxon is distributed above, below, and next to the circuit. In some embodiments, the return flux may be further engineered. As the fluxon travels ballistically through the gate, the twisting of the inductors causes the fluxon to twist in space accordingly, so that when it emerges from the gate at position 407, it is now a polarity-flipped fluxon 405 relative to how it entered the gate, having substantially the same velocity as when it entered the gate.

Operation of a computational gate is now described with reference to FIGS. 5A and 5B. The gate shown is a new component which will be referred to as a fluxon controlled swap gate, or a fluxon Fredkin gate. In these Figs., the JTLs that have previously been represented by a pair of solid lines (which, in turn, represented the superconducting inductors), are now themselves represented by single lines. The gate has a control line 501 which may carry a control fluxon, as well as two data, or target lines 502, 503, which each may carry a target fluxon. In one implementation, the presence of a data, or target fluxon, at a given time, corresponds to a computational data input of logical "1," whereas the absence of such a fluxon at a given time corresponds to a computational data input of logical "0." Similarly, the presence or absence of a control fluxon at a given time corresponds to a logical "1" or "0" value, respectively, of a control input. Other implementations are possible as well, in which the target fluxons, control fluxon, or both are conventionally understood as having the opposite logical values.

A classical Fredkin gate receives two input data bits and swaps those bits if and only if the control bit is set, as shown in the following logical table:

| Inputs | Control | Outputs |
|---|---|---|
| 11 | 1 | 11 |
| 11 | 0 | 11 |
| 10 | 1 | 01 |
| 10 | 0 | 10 |
| 01 | 1 | 10 |
| 01 | 0 | 01 |
| 00 | 1 | 00 |
| 00 | 0 | 00 |

Figure 5A:
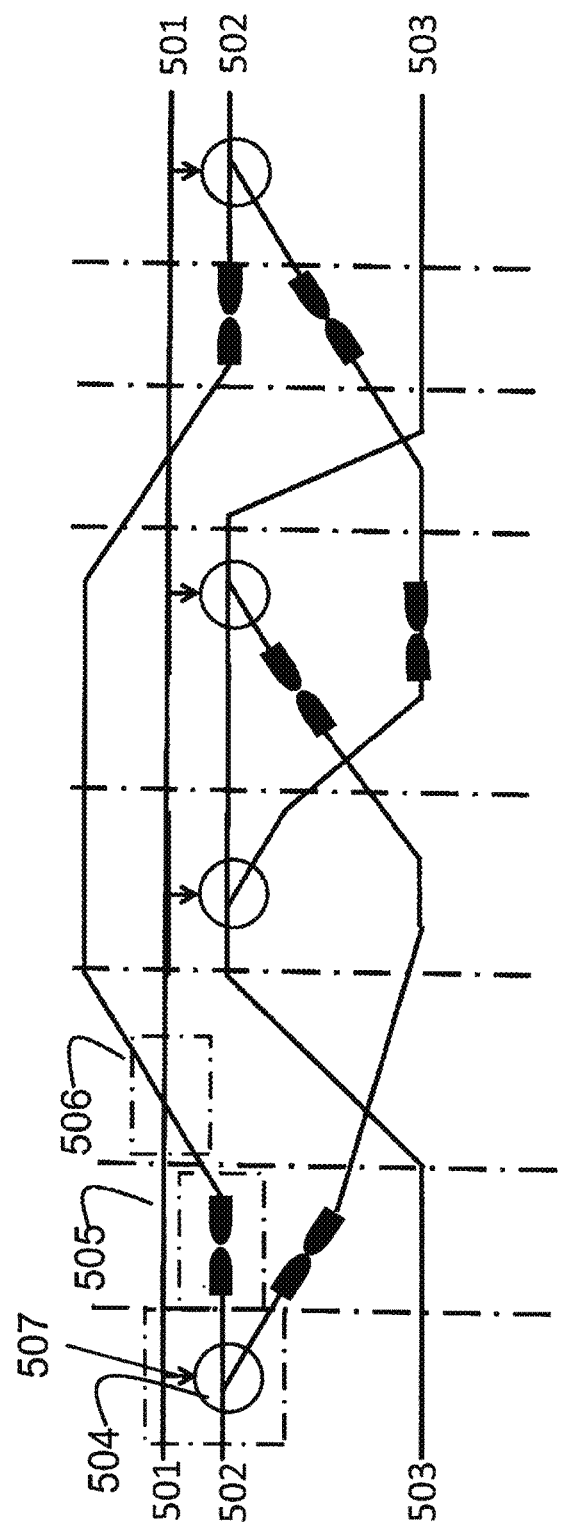
FIGS. 5A-5B a diagrams of a Fredkin gate in accordance with an embodiment of the present invention.
Figure 5B:
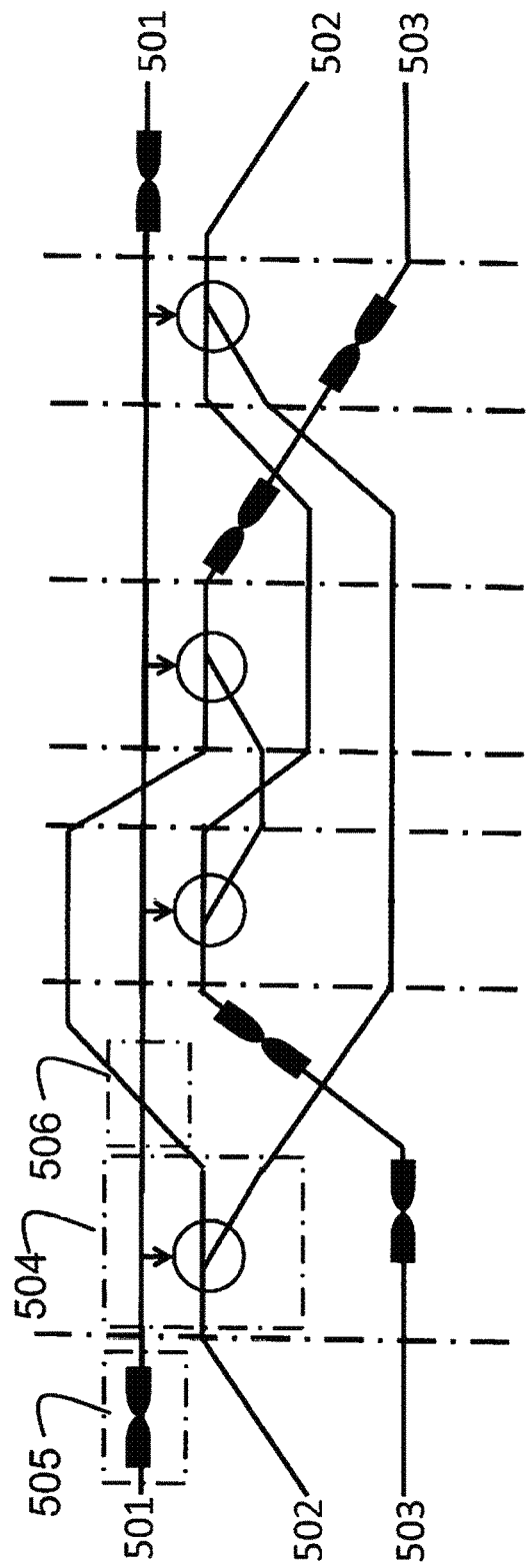

The fluxon-based gates shown in FIGS. 5A and 5B may be used to implement a classical Fredkin gate. The target fluxons, when present enter JTLs 502, 503 from the left, and the control fluxon, when present, enters JTL 501 from the left, all at substantially the same time. Symbol 504 (including a circle) represents a switch gate, as shown in FIGS. 2A and 2B, and symbol 507 (a downward-facing arrow) indicates a region where the target fluxon in JTL 502 experiences magnetic interaction with the control fluxon. Symbol 505 represents a flip gate that is used to ensure that fluxons passing through a crossthrough gate, represented by symbol 506, are of opposite signs. In FIG. 5A, the control fluxon enters the gate with the same sign as the target fluxons, and the magnetic interactions in switch gates 504 are repulsive interactions. In FIG. 5B, the control fluxon enters the gate with the same sign as the target fluxons, and the magnetic interactions in switch gates 504 are attractive interactions. In both cases, when a control fluxon is present, any target fluxon that may enter the gate on JTL 502 will exit on JTL 503, and any target fluxon that may enter the gate on JTL 503 will exit on JTL 502. Similarly, when a control fluxon is not present, any target fluxon that may enter the gate on JTL 502 will exit on JTL 502, and any target fluxon that may enter the gate on JTL 503 will exit on JTL 503. The structures shown in FIGS. 5A and 5B thus both implement a Fredkin gate using flux solitons travelling ballistically, and this can be performed without a transport current. Control fields may be added to help synchronize the fluxons.

Therefore, as is known in the art, all classical reversible computing gates can be constructed by combining the structures shown here, due to the universal nature of the Fredkin gate.

Depending on the embodiment, certain acts, events, or functions of any of the methods described herein can be performed in a different sequence, can be added, merged, or left out all together. Not all described acts or events are necessarily required for the practice of any claimed method. Moreover, in certain embodiments, acts or events can be performed concurrently, rather than sequentially.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

I claim:

1. A reversible superconducting circuit comprising:
a plurality of Josephson transmission lines, wherein:
each Josephson transmission line includes:
a discretized Long Josephson Junction, including:
a parallel array of Josephson Junctions; and
a plurality of superconducting inductors, wherein the inductors connect the Josephson Junctions in the array;
each Josephson transmission line is configured to pass a fluxon along the length of the array of Josephson Junctions, the fluxon being a soliton having total flux equal to $\Phi_0$, where $\Phi_0$ is the magnetic flux quantum;
a first of the Josephson transmission lines is configured to transmit a first target fluxon from the first of the Josephson transmission lines to one of a first output and a second output only when a first target input is active;
a second of the Josephson transmission lines is configured to transmit a second target fluxon from the second of the Josephson transmission lines to one of the first output and the second output only when a second target input is active;
a third of the Josephson transmission lines is configured to transmit a control fluxon only when a control input is active, wherein:
the reversible superconducting circuit is configured to, when at least two fluxons are transmitted, transmit the fluxons substantially synchronously; and
a path of the first target fluxon and a path of the second target fluxon are determined at least in part by a presence or an absence of the control fluxon;
the superconducting circuit is configured to, if the control input is active:
transmit the first target fluxon to the first output only if the first target input is active; and
transmit the second target fluxon to the second output only if the second target input is active; and
the superconducting circuit is configured to, if the control input is not active:
transmit the first target fluxon to the second output only if the first target input is active; and
transmit the second target fluxon to the first output only if the second target input is active.

2. The reversible superconducting circuit according to claim 1, wherein an energy dissipation of the circuit is less than $10*K*\ln 2*T$, where K is the Boltzmann constant and T is a temperature of the circuit.

3. The reversible superconducting circuit according to claim 1, wherein the energy dissipation of the circuit is less than $K*\ln 2*T$, where K is the Boltzmann constant and T is a temperature of the circuit.

4. The reversible superconducting circuit according to claim 1, wherein each fluxon is transmitted without application of a transport current.

5. The reversible superconducting circuit according to claim 1, wherein each fluxon propagates ballistically for a period of time greater than $800*1/\omega_p$, where $\omega_p$ is a plasma frequency.

6. The reversible superconducting circuit according to claim 1, wherein a propagation velocity of each fluxon decays at a rate less than $1.70*10^{-3}$ normalized velocity per $1/\omega_p$, where $\omega_p$ is a plasma frequency and normalized velocity is defined as the propagation velocity divided by a maximum soliton velocity in the same Josephson transmission line.

7. The reversible superconducting circuit according to claim 1, wherein a loss tangent of the Josephson Junctions is less than $5*10^{-3}$.

8. The reversible superconducting circuit according to claim 1, wherein a ratio between a Josephson inductance of the Josephson Junctions and an inductance of the superconducting inductors is at least 5.5.

9. The reversible superconducting circuit according to claim 1, wherein a ratio between 1) a standard deviation of a Josephson inductance of the Josephson Junctions and 2) the Josephson inductance of the Josephson Junctions, is less than 10%.

10. A reversible superconducting circuit, the circuit comprising:
    a plurality of Josephson transmission lines, wherein:
        each Josephson transmission line includes:
            a discretized Long Josephson Junction, including:
                a parallel array of Josephson Junctions; and
                a plurality of superconducting inductors, wherein the inductors connect the Josephson Junctions in the array;
        each Josephson transmission line is configured to pass a fluxon along a length of the array of Josephson Junctions, the fluxon being a soliton having a total flux equal to $\Phi_0$, where $\Phi_0$ is the magnetic flux quantum;
        a first of the Josephson transmission lines is configured to transmit a control fluxon only when a control input is active;
        a second of the Josephson transmission lines is configured to transmit a target fluxon to one of a third and a fourth of the Josephson transmission lines;
        the superconducting circuit is configured to, if the control input is active, transmit the control fluxon and the target fluxon substantially synchronously;
        the second Josephson transmission line is configured to transmit the target fluxon to the third Josephson transmission line only if the control fluxon is transmitted substantially synchronously with the target fluxon, the target fluxon being directed to the third Josephson transmission line due to an interaction between the control fluxon and the target fluxon; and
        the second Josephson transmission line is configured to transmit the target fluxon to the fourth Josephson transmission line only if no control fluxon is transmitted substantially synchronously with the target fluxon, the target fluxon being directed to the fourth Josephson transmission line due to the target fluxon following an adiabatic trajectory.

11. The reversible superconducting circuit according to claim 10, wherein the interaction between the control fluxon and the target fluxon comprises a magnetic attraction.

12. The reversible superconducting circuit according to claim 10, wherein the interaction between the control fluxon and the target fluxon comprises a magnetic repulsion.

13. The reversible superconducting circuit according to claim 10, wherein a power dissipation of the circuit is less than $K*\ln 2*T$, where K is the Boltzmann constant and T is a temperature of the circuit.

14. The reversible superconducting circuit according to claim 10, wherein each fluxon is transmitted without application of a transport current.

15. The reversible superconducting circuit according to claim 10, wherein each fluxon propagates ballistically for a period of time greater than $800*1/\omega_p$, where $\omega_p$ is a plasma frequency.

16. The reversible superconducting circuit according to claim 10, wherein a propagation velocity of each fluxon decays at a rate less than $1.70*10^{-3}$ normalized velocity per $1/\omega_p$, where $\omega_p$ is a plasma frequency and normalized velocity is defined as the propagation velocity divided by a maximum soliton velocity in the same Josephson transmission line.

17. A method of operating a reversible superconducting circuit, the method comprising:
    transmitting a control fluxon along a first Josephson transmission line only when a control input is active;
    transmitting a target fluxon along a second Josephson transmission line to one of a third and a fourth Josephson transmission line;
    if the control input is active, transmitting the control fluxon and the target fluxon substantially synchronously;
    transmitting the target fluxon along the second Josephson transmission line to the third Josephson transmission line only if the control fluxon is transmitted substantially synchronously with the target fluxon, the target fluxon being directed to the third Josephson transmission line due to an interaction between the control fluxon and the target fluxon; and
    transmitting the target fluxon along the second Josephson transmission line to the fourth Josephson transmission line only if no control fluxon is transmitted substantially synchronously with the target fluxon, the target fluxon being directed to the fourth Josephson transmission line due to the target fluxon following an adiabatic trajectory;
    wherein:
        each Josephson transmission line of the reversible superconducting circuit includes:
            a discretized Long Josephson Junction, including:
                a parallel array of Josephson Junctions; and
                a plurality of superconducting inductors, wherein the inductors connect the Josephson Junctions in the array; and
        each Josephson transmission line is configured to pass a fluxon along a length of the array of Josephson Junctions, the fluxon being a soliton having a total flux equal to $\Phi_0$, where $\Phi_0$ is the magnetic flux quantum.

18. The method according to claim 17, wherein the interaction between the control fluxon and the target fluxon comprises a magnetic attraction.

19. The method according to claim 17, wherein the interaction between the control fluxon and the target fluxon comprises a magnetic repulsion.

20. The method according to claim 17, wherein each fluxon is transmitted without application of a transport current.

* * * * *